Nov. 18, 1958

J. B. HODTUM 2,861,222

ELECTRICAL DISTRIBUTION SYSTEM WITH AUTOMATIC
SECTIONALIZING SWITCH

Filed Nov. 6, 1952

Inventor
Joseph B. Hodtum
by Didier Journeaux
Attorney

United States Patent Office 2,861,222
Patented Nov. 18, 1958

2,861,222

ELECTRICAL DISTRIBUTION SYSTEM WITH AUTOMATIC SECTIONALIZING SWITCH

Joseph B. Hodtum, Pittsburgh, Pa., assignor to Allis-Chalmers Manufacturing Company, Milwaukee, Wis.

Application November 6, 1952, Serial No. 319,013

4 Claims. (Cl. 317—22)

This invention relates in general to electrical distribution systems which have the low voltage secondary circuit comprising a plurality of interconnected sections, and more particularly to an improved arrangement which isolates a section from the rest of the system when it develops a fault.

In electrical power distribution systems of this type it is common to have the low voltage secondary circuit divided into a plurality of separate sections, with each section serving a certain portion of a district or a community and being fed from the high voltage primary circuit through a separate transformer. With this arrangement an excessive momentary demand, such as that required for starting motors, on one section will cause undesirable light flicker and a momentary decrease in voltage throughout the entire section. One way to overcome this is to interconnect adjacent sections by sectionalizing switches so that adjacent sections will cooperate to supply the increased requirement due to the momentary overload.

However the adjacent sections should be interconnected in such a manner that if one section becomes faulty it may be isolated from the system as long as the fault persists and thus not affect the operation of the remaining sections. For convenience of operation the faulty section should be connected to and disconnected from the remaining unfaulted sections automatically.

In accordance with this invention a low voltage distribution circuit divided into a plurality of sections is provided with an improved arrangement for automatically isolating a section which has become faulty and automatically reconnecting it when the fault has been removed and when the voltage is restored to normal.

It is therefore an object of the present invention to provide an improved low voltage distribution circuit divided into a plurality of interconnected sections in which any faulty section is automatically disconnected from the system.

Another object of the present invention is to provide an improved low voltage distribution circuit having a plurality of interconnected sections in which any section that is faulty is isolated and maintained isolated until the fault is removed so that the other sections will not be affected by the faulty section.

A still further object of the invention is to provide an improved low voltage distribution circuit having a plurality of interconnected sections in which any faulty section is isolated and automatically reconnected when the fault is removed and normal voltage established so that the service throughout the system is not appreciably affected by a fault in any one section.

Objects and advantages other than those mentioned above will become apparent from the following description when read in connection with the accompanying drawing, in which.

Figure 1:
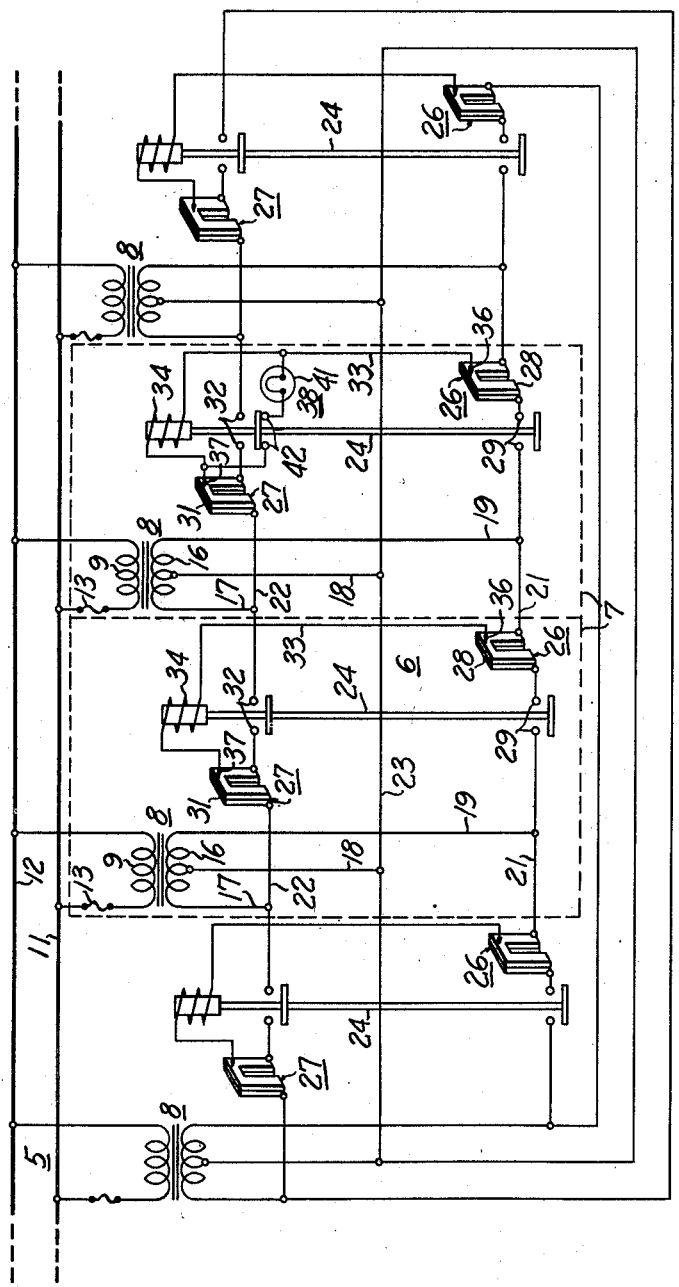
Fig. 1 shows diagrammatically an electrical distribution system with the secondary circuit comprising a plurality of sections interconnected by sectionalizing switches and an alarm system associated with one of the switches.

Referring to the drawing, the electrical distribution system shown in the deenergized condition, has a high voltage primary circuit designated generally by reference character 5. Low voltage distribution circuit 6 comprises a plurality of similar interconnected units 7 which form a closed loop. Each unit comprises a transformer 8 with the primary winding 9 connected across the lines 11, 12 of the high voltage primary circuit through any suitable automatic circuit interrupting means such as a fuse 13. Secondary winding 16 of transformer 8 is connected across a distribution line section of the unit by means of leads 17, 18, 19 to supply current to that section, for loads (not shown) which may be connected to it. Each section has a first line conductor 21, a second line conductor 22 and a neutral conductor 23, a sectionalizing switch 24 and two thermally operated switches 26, 27. The thermally operated switches may have a bimetallic element directly in series with the line so that the current in the line heats the element directly or they may have a bimetallic element heated indirectly by a heating coil in the line. As shown, thermally operated switch 26 has a heating element 28 which is a directly heated bimetallic strip connected in series with first line conductor 21 through a set of contacts 29 of sectionalizing switch 24. Thermally operated switch 27 has a heating element 31 which is shown as a directly heated bimetallic element connecting the second line conductor 22 to a set of contacts 32 of switch 24.

Each section also has a control circuit 33 for actuating switch 24. Control circuit 33 comprises a closing coil 34 which holds switch 24 closed when properly energized. Coil 34 is connected across line conductors 21, 22 through contact 37 of thermally operated switch 27, contact 36 of thermally operated switch 26, and a set of contacts 29 of sectionalizing switch 24. Each sectionalizing switch may also have an alarm system to indicate when the switch is open. Any of the alarm systems shown in Figs. 1, 3 and 4 may be used to accomplish this purpose.

Alarm system 38 serving as an indicating means responsive to opening of the switch includes a current responsive device, shown as a lamp 41, connected across coil 34 through auxiliary contacts 42 of sectionalizing switch 24, so that when coil 34 is energized and switch 24 is closed, auxiliary contacts 42 are open and current responsive device 41 is deenergized. When either thermally operated switch 26 or 27 is initially open coil 34 is deenergized, switch 24 is opened, and auxiliary contacts 42 are closed.

The low voltage circuit section of each unit has the heating element 28 of its thermally operated switch 26 connected to the first line conductor 21 of the section of an adjacent unit and contacts 32 of sectionalizing switch 24 connected to second line conductor of the same adjacent unit. The neutral conductors of sections of adjacent units are directly connected in series relation. A closed loop low voltage distribution system is thereby obtained.

The system operates as follows under normal conditions. The high voltage primary circuit 5 is energized from a suitable high voltage alternating current source (not shown). High voltage is reduced through transformers 8. Each transformer supplies to its respective unit a predetermined normal low voltage. The full voltage of secondary winding 16 appears between line conductors 21, 22, and half this voltage appears between each line conductor and neutral conductor 23. When the normal secondary voltage of the transformer is impressed across the first and second line conductors of each section, the voltage across coil 34 is the same as that across the line conductors 21 and 22. Switch 24 is so designed that it closes only when substantially normal voltage across the secondary winding is impressed across the coil 34 of switch 24. Thermally operated switches 26, 27 are normally closed, so that coil 34 is fully energized. Switch 24 closes and the sections of adjacent units are interconnected.

With the sections interconnected a momentary overload is jointly supplied by adjacent sections without any substantial disturbance of line voltage throughout the system.

Figure 2:
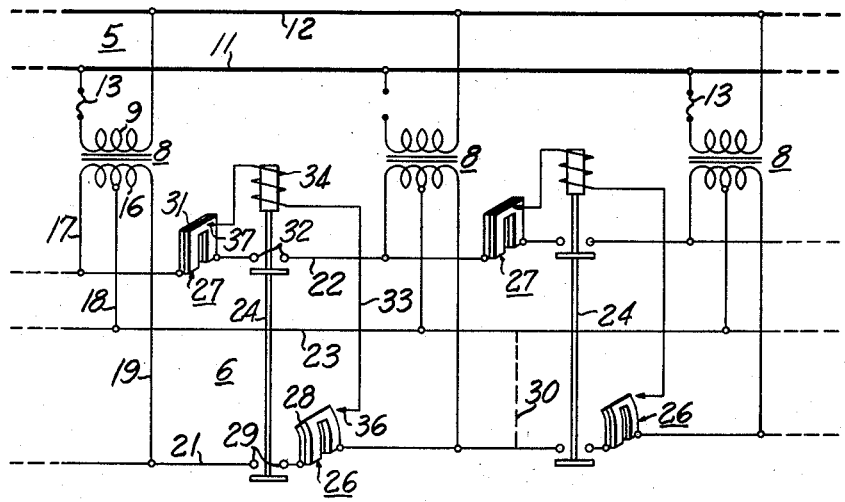
Fig. 2 shows a portion of the system of Fig. 1 after a fault occurred and the faulty section has been isolated.

When a fault occurs in any one section as shown by dashed line 30 in Fig. 2, excessive current is drawn from the transformer directly supplying current to that section and also from the transformers of the other sections. The heating elements of the thermally operated switches are designed to open the contacts 36, 37 of these switches when such a current flows through them, and thus cause the control circuits of at least two sectionalizing switches to open and deenergize their coils 34, to cause the corresponding switches 24 to open. This operation results in the faulty section being isolated from the rest of the system. Since the section is now isolated the fault causes fuse 13 in the primary winding of the transformer supplying current to that section to blow, deenergizing the section.

When the contacts of the thermally operated switches which were opened owing to the excessive current, return to closed position the control circuits are again closed and energized. The sectionalizing switches which are not adjacent the faulty line section have their control circuits energized at full voltage, so that any such switches that may have opened then reclose immediately. On the contrary, each of the sectionalizing switches adjacent the faulty line section has its closing coil energized from one of the line conductors of an adjacent section through the associated thermally operated switches, the other line conductor of the faulty section, and one half of the deenergized transformer secondary winding of the faulty section to the neutral conductor. This does not close these sectionalizing switches since only half the voltage of the line is impressed across the coils 34, the faulty section being unable to supply any voltage, and the coils are designed for the full line voltage. When the fault is removed and the fuse in the primary winding of the transformer in the deenergized section is replaced, normal conditions are restored and the sectionalizing switches adjacent the section reclose automatically.

While the sectionalizing switches having alarm systems 38 remain open their lamps 41 remain lit since they are in closed circuits through the secondary winding of the deenergized transformer, thereby indicating that the switches 24 are open. As these lamps are energized at one half the normal line voltage they must be designed for operation at such half line voltage.

The low voltage circuit 6 may also be operated as an open circuit instead of a closed loop by removing the sectionalizing switch 24 and the thermally operated switches 26 and 27 from any one of the units previously described and leaving all the other units unchanged. Low voltage distribution circuit 6 then has a plurality of the units previously described and an additional unit comprising merely a transformer 8, a fuse 13 for connecting the primary winding 9 of this transformer to the primary circuit 5, a distribution line section having first and second line conductors and a neutral conductor, and means to connect the secondary winding 16 of this transformer to supply current to this section.

Figure 3:
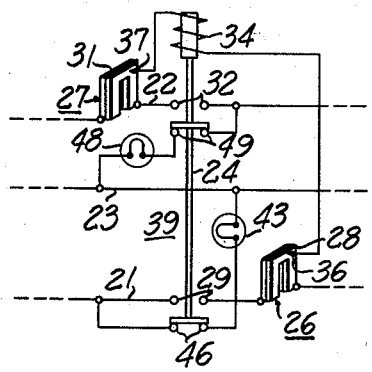
Figs. 3 and 4 show diagrammatically modifications of the alarm system shown in Fig. 1.

Alarm system 39 shown in Fig. 3 includes two current responsive devices 43, 48. Device 43, shown as a lamp, is connected between first line conductor 21 and neutral conductor 23 through first auxiliary contacts 46 of switch 24. Device 48, also shown as a lamp, is connected between second line conductor 22 and neutral conductor 23 through main contacts 32 and second auxiliary contacts 49 of switch 24. When coil 34 is deenergized switch 24 is open and auxiliary contacts 46, 49 are closed, causing one or the other of the current responsive devices 43, 48 to be energized from the line section which is not affected by the fault. It is thereby possible to determine by inspection of devices 43, 48 on which side of the switch the fault is located.

Figure 4:
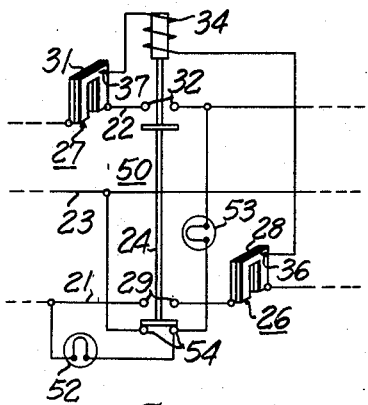

Alarm system 50 shown in Fig. 4 includes two current responsive devices 52, 53. Device 52 is connected between first line conductor 21 and neutral conductor 23 through auxiliary contacts 54 of sectionalizing switch 24. Device 53 is connected between second line conductor 22 and neutral conductor 23 through auxiliary contacts 54 and main contacts 32 of sectionalizing switch 24. Under normal conditions lamps 52 and 53 remain energized. When coil 34 is deenergized switch 24 is open and auxiliary contacts 54 are closed, causing one or the other of the current responsive devices to be energized from the line section which is not affected by the fault. The other lamp is not energized because it is shorted to neutral through auxiliary contacts 54. Hence by inspection of the lamps it is immediately determined which section has been isolated. This alarm system has the advantage that in the event one lamp fails internally, both lamps will be deenergized since they are in series. Therefore, this system will not give a false indication when one lamp fails.

Although but one embodiment of the present invention has been shown and described, it will be understood that changes and modifications may be made therein without departing from the spirit of the invention or from the scope of the appended claims.

It is claimed and desired to secure by Letters Patent:

1. An electrical distribution system comprising in combination a high voltage primary circuit; a low voltage distribution circuit comprising a plurality of sections; each of said sections including a transformer having a primary winding and a secondary winding, a plurality of conductors, circuit interrupting means connecting said primary winding to said primary circuit, means connecting said secondary winding to said conductors; means including sectionalizing switches for interconnecting the conductors of one section to the like conductors of an adjacent section; each said switch having a switch coil which when energized with the normal voltage of the section holds the switch closed; means for jointly energizing said coil from the secondaries of said transformers associated with said adjacent sections to cause said switch to close; said energizing means comprising a control circuit including in additive series relation portions of said secondaries; and means cooperating with said control circuit responsive to a fault condition in either of said adjacent sections to deenergize said coil for a predetermined time causing said switch to open and disconnect said sections whereby said circuit interrupting means associated with the faulty section operates to disconnect the transformer of that section from the primary circuit preventing said coil from being jointly energized after said predetermined time and during the period said last mentioned transformer is disconnected.

2. An electrical distribution system comprising in combination a high voltage primary circuit; a low voltage distribution circuit comprising a plurality of sections; each of said sections including a first conductor, a second conductor, and a neutral conductor, circuit interrupting means responsive to a fault in said section, and a transformer having a primary winding connected to said primary circuit through said circuit interrupting means and a secondary winding connected to said conductors to supply normal voltage between each of said conductors and said neutral; means for interconnecting the conductors of one section to like conductors of an adjacent section including a sectionalizing switch; a coil for actuating said switch; means for jointly energizing said coil from the secondaries of said transformers associated with said adjacent sections to cause said switch to close; said energizing means comprising a control circuit including an additive series relation portions of said secondaries; and means cooperating with said control circuit responsive to a fault condition in either of said adjacent sections to deenergize said coil for a predetermined time causing said switch to open and disconnect said sections whereby said circuit interrupting means associated with the faulty section operates to disconnect the transformer of that section from the primary circuit preventing said coil from being jointly energized after said predetermined time and during the period said last mentioned transformer is disconnected.

3. An electrical distribution system comprising in combination a high voltage primary circuit; a low voltage distribution circuit comprising a plurality of sections; each of said sections including a first conductor, a second conductor, and a neutral conductor, circuit interrupting means responsive to a fault in said section, and a transformer having a primary winding connected to said primary circuit through said circuit interrupting means and a secondary winding connected to supply normal voltage between each of said conductors and said neutral; means for interconnecting the conductors of one section to the like conductors of an adjacent section including a sectionalizing switch and means connecting together said neutral conductors; a coil for actuating said switch; means for jointly energizing said coil from the secondaries of said transformer associated with said adjacent sections to cause said switch to close; said energizing means comprising a control circuit including in additive series relation portions of said secondaries; and thermally operated switch means cooperating with said control circuit responsive to a fault current in either of said adjacent sections to deenergize said coil for a predetermined time causing said switch to open and disconnect said sections whereby said circuit interrupting means associated with a faulty section operates to disconnect the transformer of that section from the primary circuit preventing said coil from being jointly energized after said predetermined time and during the period said last mentioned transformer is disconnected.

4. The electrical distribution system recited in claim 3 in which each said section includes means for indicating the circuit position of said switch.

References Cited in the file of this patent

UNITED STATES PATENTS

| | | |
|---|---|---|
| 1,837,033 | Evans | Dec. 15, 1931 |
| 1,966,229 | Woodworth | July 10, 1934 |
| 2,023,096 | Parsons | Dec. 3, 1935 |
| 2,233,362 | Beeman | Feb. 25, 1941 |
| 2,497,684 | Ogden | Feb. 14, 1950 |